United States Patent Office 2,859,440
Patented Nov. 4, 1958

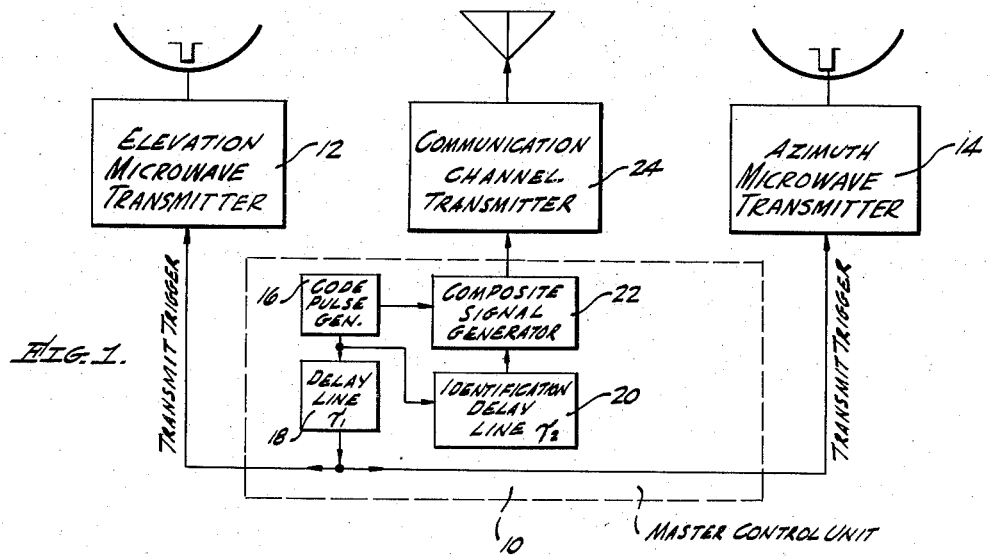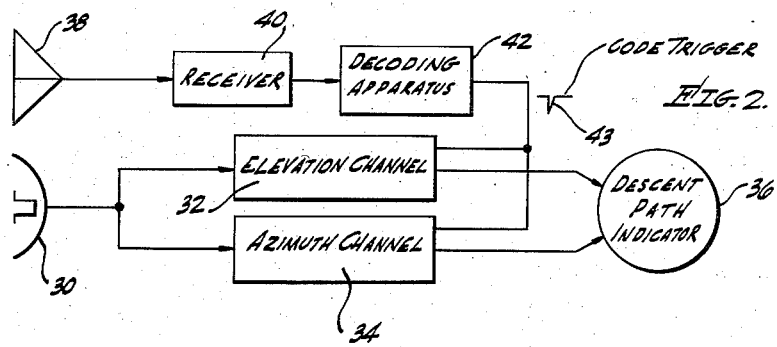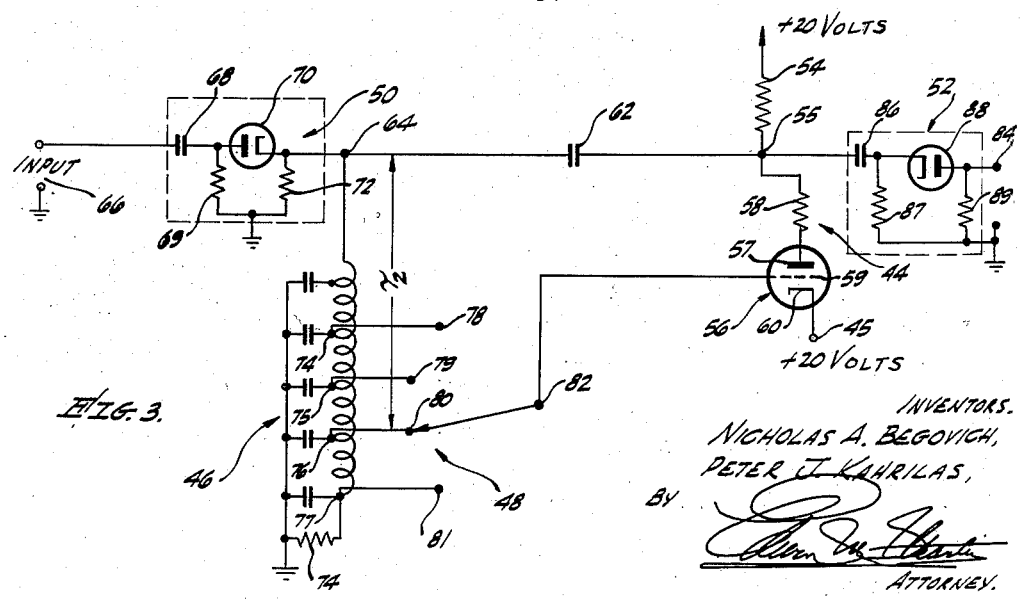

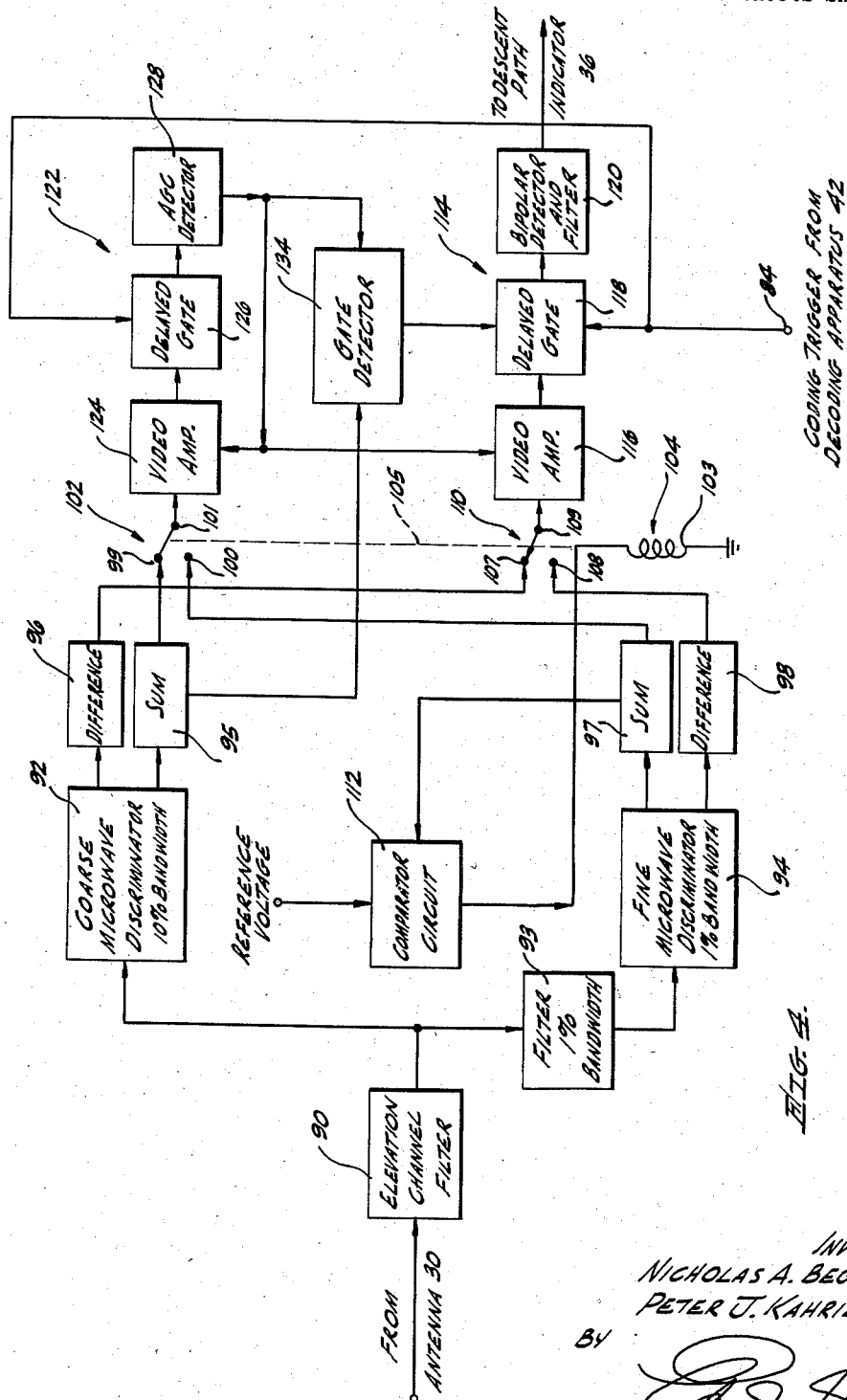

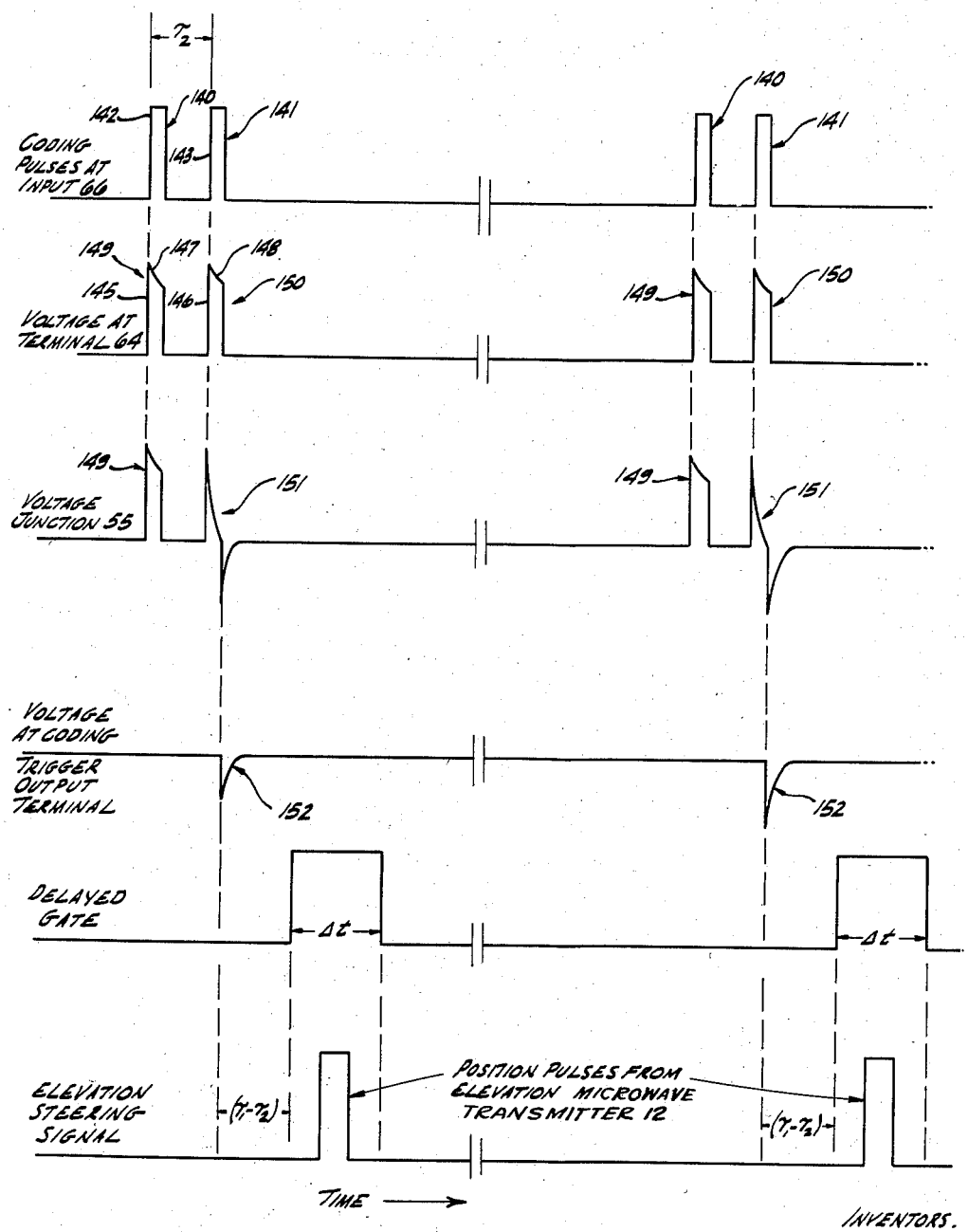

2,859,440

IDENTIFICATION SYSTEM FOR AIRPORTS

Nicholas A. Begovich and Peter J. Kahrilas, Los Angeles, Calif., assignors to Hughes Aircraft Company, Culver City, Calif., a corporation of Delaware Application March 2, 1956, Serial No. 569,052

4 Claims. (Cl. 343—108)

This invention relates to a system for use in conjunction with an instrument approach and landing system for enabling an aircraft to distinguish between two or more airport runways in the same vicinity and more particularly to apparatus for enabling an aircraft to use the instrument approach and landing system of a selected runway without interference from similar instrument approach and landing systems operating at the same frequency on other runways in the vicinity.

The purpose of an ideal instrument approach and landing system is to provide information to an aircraft to enable it to be landed on an airport runway under zero visibility conditions. In general, information of this character is transmitted to the aircraft by means of one or more electromagnetic radiation devices in the form of a signal constituting a succession of pulses either of different widths or duration or of different frequencies. For a better understanding of the invention, it will be described in conjunction with an instrument approach and landing system of the latter type which is disclosed in a copending application for patent, Serial No. 534,641 entitled "Instrument Approach and Landing System for Aircraft" filed September 16, 1955, by Nicholas A. Begovich and assigned to the assignee of the present invention. In this particular system, the approach volume to a runway is frequency-scanned from two separated points located in the immediate vicinity of the runway. The position of the aircraft with respect to the runway and more particularly with respect to a descent path is determined from the frequencies of the electromagnetic energy incident on the aircraft.

Inasmuch as an aircraft may be required to land at several airports within a comparatively short period of time, it is desirable that the frequencies of operation of the respective instrument approach and landing systems be standardized. Standardization of frequencies, however, creates a problem in areas where there are a number of instrument approach and landing systems operating in the same vicinity. Under these circumstances, it would be possible for an aircraft landing at one airport to receive erroneous landing information from another airport which might possibly cause it to deviate from its intended descent path to the runway.

The foregoing difficulties are eliminated by the apparatus of of the present invention inasmuch as it enables the pilot of an aircraft to choose the particular airport from which it is desired to receive information for directing the aircraft along a descent path to its runway. Once this selection is made, all approach and landing signals from other airports in the vicinity are automatically rejected. This is accomplished by providing means for transmitting a signal constituting two coding pulses to the aircraft prior to each pulse of the approach and landing signal. The time interval between coding pulses determines whether or not a receiver in the aircraft will be activated during the appropriate intervals of time so as to receive its associated landing signal pulse and hence is made different for each airport in any one vicinity. Also, the second of the coding pulses precedes the subsequent pulse of the approach and landing signal by a predetermined interval of time which is the same at all the airports. Apparatus is installed on the aircraft which is adapted to generate a coding trigger at the time the second coding pulse is received when the time interval between the coding pulses is equal to that selected for a particular airport. The coding trigger thus generated is employed to initiate a delayed gate pulse which is employed to gate the apparatus for receiving the approach and landing signal pulses. The delay between the coding trigger and the gate pulse is substantially equal to the predetermined interval of time above so that the gate interval includes the following pulse of the approach and landing signal. Once the coding trigger is generated, the time elapsing prior to the receiving of the pulse of the landing signal is the same irrespective of the airport selected. Thus the delayed gate activates the approach and landing signal receiver for an interval of time which includes the next position pulse immediately following the coding trigger. Inasmuch as each airport actually transmits signals less than 1% of the time, there is only a slight probability of the pulses of their respective signals coinciding. This possibility, however, can be eliminated entirely, for example, by using slightly different pulse repetition rates at the various airports.

It is therefor an object of the present invention to provide an apparatus for use in conjunction with an instrument approach and landing system for enabling an aircraft to select an airport from which it is desired to receive an approach and landing signal.

Another object of the present invention is to provide apparatus for eliminating interference between instrument approach and landing systems operating at the same frequency and in the same vicinity.

Still another object of the invention is to provide apparatus on board an aircraft for activating a receiver during short intervals of time which include the pulses constituting the instrument approach and landing system signal from a selected airport.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly uderstood, however, that the drawings are for the purpose of illustration and description only, and are not intended as a definition of the limits of the invention.

Fig. 1 is a block diagram of the portion of the apparatus of the present invention installed on the ground together with the ground installed portion of an instrument approach and landing ssytem;

Fig. 2 is a block diagram of the portion of the apparatus of the present invention installed on board an aircraft together with the aircraft installed portion of the instrument approach and landing system;

Fig. 3 is a schematic circuit diagram of an embodiment of the decoding apparatus of Fig. 2;

Fig. 4 is a block diagram of the elevation channel of Fig. 2; and

Fig. 5 shows representative wave shapes at certain points in the decoding apparatus and elevation channel of Figs 3 and 4, respectively.

Referring now to Fig 1, there is illustrated the manner in which the device of the present invention is incorporated in an instrument approach and landing system of the type disclosed in the afore-mentioned application for patent by Begovich. Referring to Fig. 1, the instrument approach and landing system comprises basically a master control unit 10 which provides transmit trigger signals for both an elevation microwave transmitter 12 and an azimuth microwave transmitter 14, each having an electronic scanning antenna. In operation of this type of instrument approach and landing system the azimuth and elevation microwave transmitters 14, 12 frequency-scan the approach volume to the runway of the airport with vertical and horizontal beams, respectively; i. e., successive pulses are radiated by the microwave transmitters 14, 12 which have a direction that is dependent on the frequency of the pulse. Thus an aircraft can determine its position with respect to the airport runway by determining the frequency of the electromagnetic energy incident on the aircraft.

In accordance with the present invention, apparatus for generating two code pulses which precede each transmit trigger signal is incorporated in the master control unit 10. This apparatus may comprise, for example, a code pulse generator 16 which generates the pulses at the pulse repetition frequency at which it is desired to operate the elevation and azimuth microwave transmitters 12, 14. The code pulses thus produced by generator 16 are impressed on a delay line 18 where a time delay of $\tau_1$ seconds is introduced prior to their being used as the transmit trigger signals for the elevation and azimuth microwave transmitters 12, 14. Accordingly, the pulses obtained from delay line 18 are impressed on elevation and azimuth microwave transmitters 12, 14 as shown. In addition, the pulses generated by code pulse generator 16 are also impressed on a delay line 20 thereby to introduce a time delay of $\tau_2$ seconds. This delay of $\tau_2$ seconds is characteristic of one airport only in any one vicinity and hence may be used for identification purposes. The interval of time $\tau_2$, with which the identication delay line 20 delays the code pulse must be shorter than the interval $\tau_1$ with which the delay line 18 delays the same code pulse. Also the difference $\tau_1-\tau_2$ in delay intervals of the delay lines 18, 20 should be the same for each airport installation. The pulses generated by the code pulse generator 16, together with the delayed pulse appearing at the output of identification delay line 20 are combined by means of a composite signal generator 22 to form a code signal which consitutes two code pulses which precede each transmitted trigger. This code signal is transmitted to the aircraft by means of a communications channel transmiter 24 which may, if desired, be the same transmiter employed to convey oral information or landing instructions to the aircraft.

Fig. 2 is a block diagram which shows the manner in which the present invention may be incorporated with the airborne portion of the afore-mentioned instrument approach and landing system. On board the aircraft is installed a slot antenna 30 for receiving the approach and landing signals transmitted by the elevation and azimuth microwave transmitters 12, 14. The antenna 30 is coupled to both an elevation channel 32 and azimuth channel 34 which convert the approach and landing signals received from the transmitters 12, 14 to direct-current voltages representative of the deviation of the aircraft in elevation and azimuth, respectively, from a desired descent path to the runway. These direct-current voltages produced by the elevation and azimuth channel 32, 34 in response to position signals from the transmitters 12, 14 are impressed on a descent path indicator 36 which provides the pilot with a visual presentation of the deviation of the aircraft from the desired descent path.

In addition to the above, an antenna 38 which is coupled to a receiver 40 is installed on board the aircraft for receiving the code signal transmitted by the communication channel transmitter 24. The code signal which appears at the output of receiver 40 is impressed on a decoding apparatus 42 which is adapted to produce a code trigger shown at 43 when the time interval between the two successive received code pulses is of a certain time interval which in the present case would be $\tau_2$. This code trigger is impressed on both the elevation and azimuth channels 32, 34 as illustrated where it is employed to initiate the operation of an apparatus which produces a gate which is delayed by an interval of time approximately equal to $(\tau_1-\tau_2)$ from the $\tau_2$ pulse and is of sufficient time duration to include the position signal pulses received from the elevation and azimuth transmitters 12, 14. The elevation and azimuth channels 32, 34 are thus activated during the interval of this delayed gate whereby only the approach and landing signals from the transmitters 12, 14 are received. Inasmuch as all the signals have traveled approximately the same distance, they will have approximately the same time relationship as they had at the time of transmission. Signals not appearing within the gated time intervals will, of course, be rejected.

Referring to Fig. 3, there is shown an example of an embodiment of the decoding apparatus 42 of Fig. 2. As shown in this figure, the apparatus 42 of Fig. 2 may comprise a series circuit 44 connected between a source of positive potential and a terminal 45, a tapped delay line 46, a four-pole rotary switch 48, a short-time-constant input circuit 50 and an output circuit 52. The series circuit 44, commencing from the potential source indicated at +20 volts, includes a leakage resistor 54 connected between the source and a junction 55, and a triode 56 having a plate 57 connected through a resistor 58 to the junction 55, a control grid 59 and a cathode 60 connected to the terminal 45 which is maintained at a predetermined positive potential substantially equal to that which is impressed on resistor 54. This potential may, for example, be of the order of +20 volts with respect to ground. The junction 55 is connected through a capacitor 62 to an output terminal 64 of the short-time-constant input circuit 50 which has an input 66 coupled to the receiver 40 of Fig. 2. The purpose of the short-time-constant input circuit 50 is to pass only those pulses which have a width comparable to that of the coding pulses used above. One form of this circuit includes a capacitor 68 connected from the input 66 through a leakage resistor 69 to ground. The time constant of capacitor 68 and leakage resistor 69 is substantially longer than the interval $\tau_2$ between the coding pulses. A diode 70 in series with a resistor 72 is connected in the order named from the capacitor 68 to ground in shunt with the leakage resistor 69. The capacitor 68, the diode 70 and the resistor 72 have a time constant that is comparable to the duration of the coding pulses used. Also, the junction between diode 70 and resistor 72 is connected to the terminal 64 and the polarity of the diode 70 is connected so as to allow positive excursions of a signal to appear at the output terminal 64.

The output terminal 64 of the short-time-constant input circuit 50, in addition to being connected through the capacitor 62 to the junction 55, is also connected to the input of the tapped delay line 46, the output of which is terminated with a resistor 74 which is referenced to ground. Taps 74–77 on the delay line 46 are located at points which provide delays equal to those which are used by each of several airports in any one vicinity. These taps 74–77 are connected, respectively, to four input terminals 78–81 of the rotary switch 48. In the present case, the delay provided at the tap 76 which is connected to the input terminal 80 which, in turn, is selectively connected to an output terminal 82 of the rotary switch 48 is $\tau_2$ seconds, the same as that introduced by the identification delay line 20 of Fig. 1. The output terminal 82 from the rotary switch 48 is connected to control grid 59 of the triode 56 of the series circuit 44 thereby to maintain the grid 59 at quiescent ground potential which is 20 volts negative with respect to the potential of the cathode 60.

Last, the output circuit 52 of the apparatus 42 constitutes a circuit for reproducing only the negative excursions of the potential at junction 55 at a coding trigger output terminal 84. Accordingly, output circuit 52 may comprise a capacitor 86 in series with a leakage resistor 87 connected in the order named from junction 55 to ground. Further, a diode 88 in series with an output resistor 89 is connected in the order named from capacitor 86 to ground, the polarity of the diode 88 being selected so that only negative excursions of potential are developed across the output resistor 89. These negative excursions of potential constitute the coding trigger signal which is made available at the coding trigger output terminal 84 by means of a connection therefrom to the junction between the output resistor 89 and the diode 88. A more detailed description of the operation of the decoding apparatus 42 will be more easily understood after a description of the elevation and azimuth channels 32, 34 with which it operates.

The coding trigger output terminal 84 of the decoding apparatus 42 is coupled to both the elevation and azimuth channels 32, 34. Inasmuch as the elevation and azimuth channels 32, 34 are similar except for the frequency ranges of received input signals covered, only the elevation channel 32 of which a block diagram is shown in Fig. 4 will be described. Referring to this figure, the elevation channel 32 comprises an elevation channel filter 90 which is coupled to the antenna 30 installed on board the aircraft. The elevation filter 90 is of the bandpass type with a pass band frequency range that is coextensive with that employed by the elevation microwave transmitter 12. The output of the elevation channel filter 90 is coupled to both a coarse microwave discriminator 92 that has approximately 10% bandwidth coextensive with the pass band of filter 90, and through a filter 93 of 1% pass band to a fine microwave discriminator 94 with a corresponding 1% bandwidth. The output signal from the coarse and fine discriminators 92, 94, when operating within their respective bandwidths, constitutes a succession of video pulses received from the elevation microwave transmitter 12.

The output signal from the coarse microwave discriminator 92 is impressed on both a sum circuit 95 and a difference circuit 96. Similarly, the output signal from the fine microwave discriminator 94 is impressed on both a sum circuit 97 and a difference circuit 98. The outputs from the sum circuits 95, 97 are connected, respectively, to pole terminals 99, 100 of a single-pole double-throw switch 102 which is operated by a solenoid 103 of a solenoid relay 104 by means of a mechanical linkage 105. Similarly the outputs from the difference circuits 96, 98 are connected, respectively, to pole terminals 107, 108 of a single-pole double-throw switch 110 which is also operated by the solenoid 103 through the mechanical linkage 105. Mechanical linkage 105 thus provides a mechanical interlock between the switches 102, 110 such that their respective throw contacts 101, 109 are either simultaneously connected with terminals 99 and 107 or with terminals 100 and 108. Thus, whether or not the solenoid 103 of relay 104 is energized or not determines whether the output of the sum and difference circuits 95, 96 from the coarse discriminator 92 or the output of the sum and difference circuits 97, 98 from the fine discriminator 94 appear at the throw contacts 101, 109 of the switches 102, 110, respectively. In the present case, the energization of the solenoid 103 is controlled by the position of the aircraft with respect to the descent path to the runway as determined by the instrument approach and landing system. In this respect, the 1% bandwidth of the filter 93 includes the signal frequencies which will be received when the deviation of the aircraft from the descent path is small. When this is the case, a signal will pass through the filter 93 and be impressed on the fine microwave discriminator 94, which will result in a signal constituting a series of video pulses appearing at the output of sum circuit 97. This signal is then impressed on a comparator circuit 112, together with a reference voltage. When the smoothed signal from the sum circuit 97 exceeds the reference voltage, the comparator circuit 112 operates in a manner to cause a direct current to flow through the solenoid 103 of the relay 104, thereby switching the throw contacts 101, 109 from pole terminals 99, 107 to the pole terminals 100, 108, respectively, whereby the output signals from the sum and difference circuits 97, 98 appear at the output of the switches 102, 110 in place of the signals from the sum and difference circuits 95, 96.

The throw contact 109 of the switch 110, on which either the output from the difference circuit 96 or the output from the difference circuit 98 appears, is connected through an elevation error signal channel 114 to the descent path indicator 36. The error signal channel 114 comprises a video amplifier 116, a delayed gate circuit 118 and a bipolar detector and filter 120 connected in cascade in the order named. The throw contact 101 of the switch 102, on which appears either the output signal of the sum circuit 95 or the output signal from the sum circuit 97 is connected to an automatic gain control channel 122. This automatic gain control channel 122 comprises a video amplifier 124, a delayed gate circuit 126, and an automatic gain control detector 128 connected in cascade in the order named. The delayed gate circuits 118, 126 are responsive to the coding trigger from the decoding apparatus 42 and, hence, are each coupled to terminal 84 as shown. In addition the gain of the video amplifiers 116, 124 is controlled by the automatic gain control detector 128 by means of suitable connections thereto as indicated. Also, a gate detector 134 is coupled to the sum circuit 95 and the automatic gain control circuit 128 to compare the magnitudes of the output signals therefrom to determine whether the delayed gate circuits 118, 126 are allowing the desired signal from the elevation microwave transmitter 12 to pass. When the average output signal of the automatic gain detector 128 exceeds that of the sum circuit 95, it is an indication that an indirectly received position signal is being gated. Accordingly, the gate detector 134 produces a voltage which is impressed on the delayed gate circuit 118 to prevent an erroneous signal from reaching the descent path indicator 36.

In order to more clearly explain the operation of the device of the present invention, waveforms of the signal voltages appearing at certain places throughout the decoding apparatus 42 and the elevation channel 32 are shown in Fig. 5 in the time sequence in which they appear. During operation, two coding pulses 140, 141 with leading edges separated by a time interval, $\tau_2$, as shown in Fig. 5 are transmitted to the aircraft by means of the communications channel transmitter 24 prior to the transmission of each position frequency pulse signal transmitted by the elevation and azimuth microwave transmitters 12, 14. In the present case, the coding pulses 140, 141 are received at the aircraft by means of the antenna 38 and the receiver 40. For the purposes of explanation, it is assumed that the coding pulses 140, 141 are substantially undistorted as shown in the figure.

The coding pulses 140, 141 appearing at the output of receiver 40 are impressed on the input 66 of the short-time-constant input circuit 50 of the decoding apparatus 42. Leading edges 142, 143 of the pulses 140, 141, upon being impressed on the input side of the capacitor 68 produce corresponding voltage rises 145, 146, respectively, on the output side of capacitor 68 which appear across the resistor 69 and at the terminal 64. Inasmuch as this is a positive excursion of potential, and capacitor 68, diode 70 and resistor 72 constitute a short-time-constant circuit as compared to the duration of the coding pulses 140, 141, the potential on capacitor 68 immediately commences to discharge after the voltage rises 145, 146, respectively, as indicated by the curves 147, 148. At the termination of each of the coding pulses 140, 141, the potential at the input 66 decreases by an amount equal to the peak amplitude of the pulses 140, 141 which produces a negative excursion of potential at the output side of capacitor 68, since the potential initially on this side has already been partially discharged. The diode 70, however, prevents the potential at terminal 64 from going negative whence the coding pulses 140, 141 have waveforms 149, 150, respectively, at terminal 64 as shown in Fig. 5.

The purpose of the input circuit 50 is to prevent the erroneous generation of coding triggers by preventing negative pulses or positive pulses of long duration to appear at the terminal 64. In order to accomplish this, the diode 70 is poled so as to isolate any negative excursion of potential of capacitor 68 from the terminal 64. Also, if a long positive pulse is applied to input 66, the capacitor 68 will be rapidly discharged through resistor 72 and diode 70, and the resulting negative excursion of potential produced on capacitor 68 at the termination of the pulse is isolated from terminal 64 by the diode 70. On the other hand, if a long negative pulse is applied, the capacitor 68 will charge very slowly because of the long time constant of capacitor 68 and resistor 69. Thus, in periods comparable to $\tau_2$ seconds, the resulting positive excursion at the termination of the pulse will be very small. In periods substantially longer than $\tau_2$ seconds, a positive excursion of potential approximately equal to the height of the pulse may be produced. It is evident, however, that a second positive pulse $\tau_2$ seconds later, which is necessary for the production of a coding trigger, as will be hereinafter explained, cannot be produced in this manner.

Thus, the potential waveforms 149, 150 appear at the output terminal 64 of the short-time-constant input circuit 50 when coding pulses 140, 141 are applied to the input 66. Inasmuch as the negative bias voltage normally applied to the control grid 59 prevents any current from flowing in the series circuit 44, the potential waveform 149 is reproduced at junction 55 but is isolated from the coding trigger output terminal 84 by diode 88. The delay line 46, however, introduces a delay of $\tau_2$ seconds in the potential waveform 149 thereby causing it to appear as a positive voltage on the control grid 59 of the triode 56 simultaneously with the appearance of potential waveform 150 at junction 55. With positive potentials applied simultaneously to both the plate 57 and the control grid 59 of the triode 56, current flows through the triode 56 and resistor 58 to discharge the capacitor 62. The time constant of the capacitor 62 with resistor 58 and the plate resistance of triode 56 is made sufficiently short so that the capacitor 62 is completely discharged within the duration of the coding pulse 140 or 141. Thus, at the termination of the potential waveform 150, current has ceased flowing through the triode 56 and the potential of the junction 55 is made to go sharply negative by an amount equal to the amplitude of the trailing edge of the waveform 150. This decrease in potential makes the potential at junction 55 less than the quiescent potential impressed on resistor 54 wherefore the capacitor 62 recharges to its quiescent potential by leakage current which flows through the resistor 54. Under the foregoing circumstances, a potential having a waveform 151, as shown in Fig. 5, appears at the junction 55.

Inasmuch as only positive pulses are allowed to be impressed through the capacitor 62 on to the junction 55, negative excursions of potential will occur at the junction 55 only after current has been made to flow through the triode 56 and resistor 58 to discharge the capacitor 62. Also, in accordance with the present invention, it is desired to produce a coding trigger when coding pulses are applied to the triode 56 in a manner to effect a flow of current. Accordingly, the diode 88 is poled to prevent the positive portions of the potential waveforms 149, 151 from appearing at the coding trigger output 84. The negative portions of the potential excursions at junction 55, however, produce current flow through resistor 89 and diode 88 whereby coding triggers are produced at the coding trigger output terminal 84 such as illustrated by the potential waveforms 152 of Fig. 5.

With particular regard for the operation of the elevation channel 32, the coding triggers produced as explained above are impressed on the delayed gate circuits 118, 126 whereby the elevation error signal channel 114 and the automatic gain control channel 122 are activated for an interval of time $\Delta t$ which commences slightly less than $(\tau_1-\tau_2)$ seconds after each coding trigger and includes the position pulse transmitted from the elevation microwave transmitter 12. Inasmuch as the elevation channel is only activated for a short interval of time $\Delta t$ at the time of the arrival of position pulses from the elevation radar 12, there will be no interference from other similar instrument approach and landing systems operating at the same frequency in the same vicinity. It is evident that the approach and landing signal from a different airport in the same vicinity may be received by inserting the proper delay between the control grid 59 of triode 56 and the input circuit 50 by means of the tapped delay line 46 and the rotary switch 48 and tuning the receiver 40 to receive the coding pulses from the selected airport.

While there have been described above the principles of the invention in connection with specific apparatus, it is to be clearly understood that this description is made by way of example only and not as a limitation as to the scope of the invention as set forth in the objects thereof and in the accompanying claims.

What is claimed is:

1. In an instrument approach and landing system including apparatus for radiating a sequence of electromagnetic intelligence pulses throughout a selected approach volume to an airport runway whereby an aircraft can determine its position with respect to the runway from the characteristics of the pulses incident thereon, said apparatus having means for producing first and second coding pulses prior to each one of said intelligence pulses, the time interval, $\tau_2$, between said first and second coding pulses being characteristic of said airport, and the time interval $(\tau_1-\tau_2)$, between the last of said coding pulses and the next succeeding intelligence pulse being the same for each airport in a particular vicinity, and means for transmitting said coding pulses to said aircraft, a device disposed on board said aircraft comprising: receiving apparatus for receiving said sequence of electromagnetic intelligence pulses, a delayed gate circuit responsive to a coding trigger coupled to said receiving apparatus for gating the output signal therefrom, said gated output commencing at a time substantially equal to $(\tau_1-\tau_2)$ after each coding trigger, means for receiving said first and second coding pulses, and means responsive to said coding pulses for producing said coding trigger at the time of occurrence of said second coding pulse when the time interval between said first and second coding pulses is equal to $\tau_2$.

2. The receiving device as defined in claim 1 wherein said means responsive to said first and second coding pulses comprises: a series circuit including an electron discharge device having at least a plate, a control grid and a cathode, and a capacitor, one side of said capacitor being connected to said plate, the time constant of said capacitor and said electron discharge device, when conducting, being short as compared to the duration of said first and second coding pulses; means for maintaining said electron discharge device in a normally non-conductive state; means coupled to said means for receiving said first and second coding pulses and including a delay line for simultaneously impressing said first coding pulse on said control grid and said second coding pulse through said capacitor on said plate thereby rendering said electron discharge device conductive and discharging said capacitor whereby the trailing edge of said second coding pulse produces a negative excursion of potential on said one side of said capacitor; and means responsive to said negative excursion of potential coupled to said one side of said capacitor for producing said coding trigger.

3. The receiving device as defined in claim 1 wherein said means responsive to said first and second coding pulses comprises: a first junction maintained at a first quiescent potential level positive with respect to ground; an electron discharge device having at least a plate, a control grid and a cathode, said plate being connected to said first junction and said cathode being connected to a second junction maintained at a second potential level substantially equal to said first quiescent potential level; means for maintaining said control grid at a third quiescent potential level sufficiently negative with respect to said second potential level to prevent current from flowing through said discharge device irrespective of positive excursions of potential on said first junction; a third junction coupled to said means for receiving said first and second coding pulses; a capacitor coupled from said first junction to said third junction, said capacitor and said discharge device, when conducting, having a time constant that is short compared to the duration of said first and second pulses; a delay line connnected from said third junction to said control grid for introducing a delay of $\tau_2$ therebetween, whereby said first coding pulse appears on said control grid simultaneously with the appearance of said second coding pulse on said first junction, thereby rendering electron discharge device conductive and discharging said capacitor, whereby the occurrence of the trailing edge of said second coding pulse at said third junction produces a negative excursion of potential at said first junction; and means responsive to said negative excursion of potential coupled to said first junction for producing said coding trigger.

4. In an instrument approach and landing system having apparatus for radiating a sequence of positioning pulses throughout a selected approach volume to an airport runway whereby an aircraft can determine its position from the characteristics of the pulses incident thereon, apparatus comprising means for producing a first and a second coding pulse prior to each one of said positioning pulses, the time interval between said first and second coding pulses being characteristic of said airport and the last of said coding pulses preceding each one of said positioning pulses by a predetermined interval of time, means for transmitting said coding pulses to said aircraft, means incorporated in apparatus for receiving said positioning pulses on board said aircraft and responsive to the time interval between said coding pulses for gating said apparatus on board said aircraft during intervals of time which include the periods when said positioning pulses are received.

References Cited in the file of this patent
UNITED STATES PATENTS

| | | |
|---|---|---|
| 2,433,381 | Marchand | Dec. 30, 1947 |
| 2,448,016 | Busignies | Aug. 31, 1948 |
| 2,588,930 | Rendall | Mar. 11, 1952 |